United States Patent
Hopper et al.

(10) Patent No.: US 7,255,073 B2
(45) Date of Patent: Aug. 14, 2007

(54) ELECTROMECHANICAL VALVE ACTUATOR BEGINNING OF STROKE DAMPER

(75) Inventors: Mark L. Hopper, Ypsilanti, MI (US); Shawn H. Swales, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 13 days.

(21) Appl. No.: 10/929,969

(22) Filed: Aug. 30, 2004

(65) Prior Publication Data

US 2005/0076865 A1    Apr. 14, 2005

Related U.S. Application Data

(60) Provisional application No. 60/510,989, filed on Oct. 14, 2003.

(51) Int. Cl.
    *F01L 9/02*    (2006.01)
(52) U.S. Cl. .................. 123/90.11; 123/90.12; 251/129.15
(58) Field of Classification Search .......... 123/90.11, 123/90.12, 90.13, 90.48, 90.52, 90.45; 251/12, 251/30.2, 129.01, 129.02, 129.15, 129.16
    See application file for complete search history.

(56) References Cited

U.S. PATENT DOCUMENTS

| | | | |
|---|---|---|---|
| 4,762,095 A | 8/1988 | Mezger et al. |
| 4,802,448 A | 2/1989 | Ableitner |
| 5,704,319 A | 1/1998 | Engelhardt et al. |
| 5,762,035 A | 6/1998 | Schebitz |
| 5,772,179 A | 6/1998 | Morinigo et al. |
| 5,927,237 A | 7/1999 | Komatsu et al. |
| 6,037,851 A | 3/2000 | Gramann et al. |
| 6,047,673 A | 4/2000 | Lohse et al. |
| 6,089,197 A | 7/2000 | Lange et al. |
| 6,262,498 B1 | 7/2001 | Leiber |
| 6,289,858 B1 | 9/2001 | Altdorf et al. |
| 6,352,059 B2 | 3/2002 | Stolk et al. |
| 6,354,253 B1 | 3/2002 | Katsumata et al. |
| 6,397,798 B1 | 6/2002 | Fiaccabrino |
| 6,427,650 B1 | 8/2002 | Cristiani et al. |
| 6,453,855 B1 | 9/2002 | Di Lieto et al. |
| 6,467,441 B2 | 10/2002 | Cristiani et al. |
| 6,477,994 B2 * | 11/2002 | Umemoto et al. ....... 123/90.11 |
| 6,502,804 B1 | 1/2003 | Schwegler et al. |
| 6,516,758 B1 | 2/2003 | Leiber |
| 6,517,044 B1 | 2/2003 | Lin et al. |

(Continued)

FOREIGN PATENT DOCUMENTS

DE    19728479 C2 *    8/2001

(Continued)

*Primary Examiner*—Ching Chang
(74) *Attorney, Agent, or Firm*—Dickinson Wright PLLC (57) ABSTRACT

An electromechanical valve actuator having a beginning of stroke damper to damp the impact between the armature stem and the valve stem as the valve is opened. The beginning of stroke damper includes an armature stem defining a stem passage and a valve stem including a lash compensator defining a cavity communicating with the stem passage. An oil pocket may be provided within the cavity to absorb the impact of the armature stem before the armature stem contacts the valve stem as the valve is opened. The lash compensator is configured so that the cavity has a discharge rate sufficient to ensure that the cavity completely drains at approximately the time the engine valve reaches the full open position.

6 Claims, 5 Drawing Sheets

U.S. PATENT DOCUMENTS

| | | |
|---|---|---|
| 6,526,928 B2 | 3/2003 | Bauer et al. |
| 6,546,904 B2 | 4/2003 | Marchioni et al. |
| 2002/0163329 A1 | 11/2002 | D'Alpaos et al. |
| 2003/0034470 A1 | 2/2003 | Padroni |
| 2003/0056743 A1 | 3/2003 | Cristiani et al. |
| 2003/0160197 A1 | 8/2003 | Kodama |

FOREIGN PATENT DOCUMENTS

| | | |
|---|---|---|
| DE | 10303769 A1 * | 8/2003 |
| EP | 1 464 795 A2 | 10/2004 |
| JP | 2001-336663 | 12/2001 |
| JP | 2003-166406 | 6/2003 |

* cited by examiner

ELECTROMECHANICAL VALVE ACTUATOR BEGINNING OF STROKE DAMPER

CROSS-REFERENCE TO RELATED APPLICATION

This application claims the benefit of U.S. Provisional Application No. 60/510,989, filed Oct. 14, 2003, the entire disclosure of this application being considered part of the disclosure of this application and hereby incorporated by reference.

BACKGROUND OF THE INVENTION

The present invention relates to electromechanical valves actuators and, more particularly, to electromechanical valve actuators that reduce noise, vibration, and harshness issues associated with the opening of the valve.

As engine technology advances and manufacturers strive to increase engine power, improve fuel economy, decrease emissions, and provide more control over engines, manufacturers are developing electromechanical valve actuators to replace cam shafts for opening and closing engine valves. Electromechanical valve actuators allow selective opening and closing of the valves in response to various engine conditions.

Electromechanical valve actuators generally include two electromagnets formed from a core having an embedded power coil. A spring loaded armature located between the electromagnets is movable between the electromagnets as the power coils are selectively energized to create a magnetic force to attract the armature. The surface of the electromagnets to which the armature is attracted when the power coil of an electromagnet is energized is generally referred to as a pole face. The armature abuts to the valve so that as the armature moves between pole faces in pole-face-to-pole-face operation, the valve is opened and closed.

When the valve is in a closed position, the armature plate is generally held against or near the armature electromagnet and a gap is created between the armature stem and the valve stem. This gap is commonly referred to as a lash gap. The lash gap allows thermal movement of metal parts during engine operation and is necessary to ensure that under all conditions the valve is fully closed, while the armature is seated on or near the armature electromagnet pole face. One problem with traditional electromechanical valves is that noise, vibration, and harshness issues occur when the armature stem contacts the valve stem as the valve is opened. More specifically, as the armature plate is released from the armature electromagnet, the armature spring pushes the armature assembly, specifically the armature stem, toward the valve stem so that the armature stem, contacts the valve stem, typically a lash cap on the valve stem, at a high velocity to move the valve from the closed position to the open position. The impact between the valve stem and armature stem may cause noise, vibration, and harshness issues. These noise, vibration, and harshness issues may be amplified due to the excitement of other components within the electromechanical valve actuator, such as the armature plate which may act as a radiator to amplify the noise.

While some manufacturers have attempted to alleviate these problems by combining traditional hydraulic lifters with electromechanical valve actuators, problems may occur from this combination. Hydraulic lifters typically increase the friction experienced by electromechanical valve actuators and add mass to the moving parts. Any increase in mass or friction requires additional power consumption by the electromechanical valve actuator to move the armature and valve and such additional power consumption is particularly acute in opening the valve during the exhaust cycle. Additional power consumption raises additional issues such as undesirable excess heating of the electromagnet power coils and consumption of additional electrical power from the vehicle's generating system which reduces fuel economy and adds to the cost of the generating and distribution system. Any requirement of additional power puts increased demand on today's already overloaded vehicle electrical systems. Another disadvantage to using traditional hydraulic lifters is that hydraulic lifters are relatively expensive and add to the overall cost of the vehicle.

To avoid additional expense, increased friction, increased mass, and increased power consumption associated with hydraulic lifters, some manufacturers have attempted to limit the impact force between the valve stem and armature stem by controlling the current profile supplied to the electromagnets. One method of controlling the current profile includes slowly decreasing the current supplied to the armature electromagnet. For example, the electromechanical valve actuator control system slowly lessens the amount of magnetic attraction of the armature electromagnet. As the force of the armature spring surpasses the combined force of the valve spring and magnetic attraction force of the armature electromagnet, the armature accelerates away from the armature electromagnet. The armature electromagnet continues to apply a magnetic attraction force to the armature plate, thereby slowing the acceleration away from the armature electromagnet. While current profile control reduces noise, vibration, and harshness issues associated with the contact between the armature stem and valve stem during the opening of the valve, current profile control requires additional power consumption as the armature electromagnet works against the force provided by the armature spring. The power consumption of the valve electromagnet is also significantly increased due to the increased magnetic force needed to attract and retain the armature plate against the valve electromagnet. More specifically, because the force applied by the armature spring was inhibited by the armature electromagnet during the initial portion of the open cycle, the valve electromagnet must compensate for this inhibition by increasing the magnetic attraction force of the valve electromagnet. As stated above, to increase magnetic attraction, increased power consumption is required which raises additional problems. Further, the increased power consumption is particularly acute due to the distance between the valve electromagnet and armature plate at which the valve electromagnet must apply the magnetic force especially due to the exponential decrease in magnetic force as the distance increases. Another problem associated with current profile control include the necessity of additional and expensive position sensors and microprocessors to accurately determine and control the position and movement of the armature assembly. Yet another problem with current profile control is that as the armature plate approaches the pole face, the gap between the pole face and armature plate, generally referred to as the air gap, decreases, causing the magnetic force acting on the armature to exponentially increase. This exponential increase is particularly acute due to the additional power being applied by the valve electromagnet to the armature in response to reduced force from the armature spring to ensure attraction and retention of the armature plate as desired. Any increase in magnetic force causes the armature to increase in velocity as it approaches the pole face of the energized electromagnet thereby increasing the force of the impact of the armature. This impact causes noise, vibration, and harshness concerns, also making quiet operation of electromechanical valve actuators challenging to achieve.

In view of the foregoing, there is a need for an electromechanical valve actuator having reduced noise, vibration, and harshness issues during opening of the valve, especially during the exhaust cycle, without having increased power consumption.

SUMMARY OF THE INVENTION

The present invention relates to electromechanical valves actuators and, more particularly, to electromechanical valve actuators that reduce noise, vibration, and harshness issues associated with the opening of the valve. The electromechanical valve actuator includes a low mass beginning of stroke damper to dampen the impact between the armature stem and the valve stem as the valve is opened without the need for expensive position sensors and microprocessors for current profile control and without substantially increasing the impact force of the armature plate against the valve magnet. The beginning of stroke damper includes an armature stem defining a stem passage and a valve stem including a lash compensator defining a cavity communicating with the stem passage. The lash compensator may include an annular sleeve. The armature stem and annular sleeve define the cavity. A stem plug having a fluid passage may be coupled to the armature stem. The annular sleeve and armature stem define an annular gap therebetween having a cross sectional area that is greater than or equal to the cross sectional area of at least a portion of the stem passage of the fluid passage in the stem plug.

The method of the present invention includes providing fluid to a cavity between the armature stem and the valve stem, and reducing the size of the cavity by displacing fluid from the cavity before impacting the valve stem with the armature stem. The fluid pocket in the cavity may be provided by supplying fluid through a stem passage defined by the armature stem or valve stem. The fluid pocket is configured to have a discharge rate approximately greater than or equal to a fluid supply rate through the stem passage. To ensure desired engine performance, the size of the cavity may be limited when the valve is in a closed position to prevent the valve from moving relative to the armature stem. The cavity size is generally limited by selecting a valve stem or lash compensator having a sufficiently small area to which the fluid pressure is applied, thereby ensuring that any hydraulic force applied to the valve in a closed position is smaller than the preload force that keeps the valve in a closed position. The cavity size may also be limited by selecting a cross sectional area of the annular gap that is greater than or equal to the cross sectional area of the stem passage, thereby allowing the valve to maintain its preload on the valve seat, irrespective of how much fluid is provided through the stem passage. The provided fluid may also act as a lubricant and a cooling agent for the electromechanical valve actuator.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
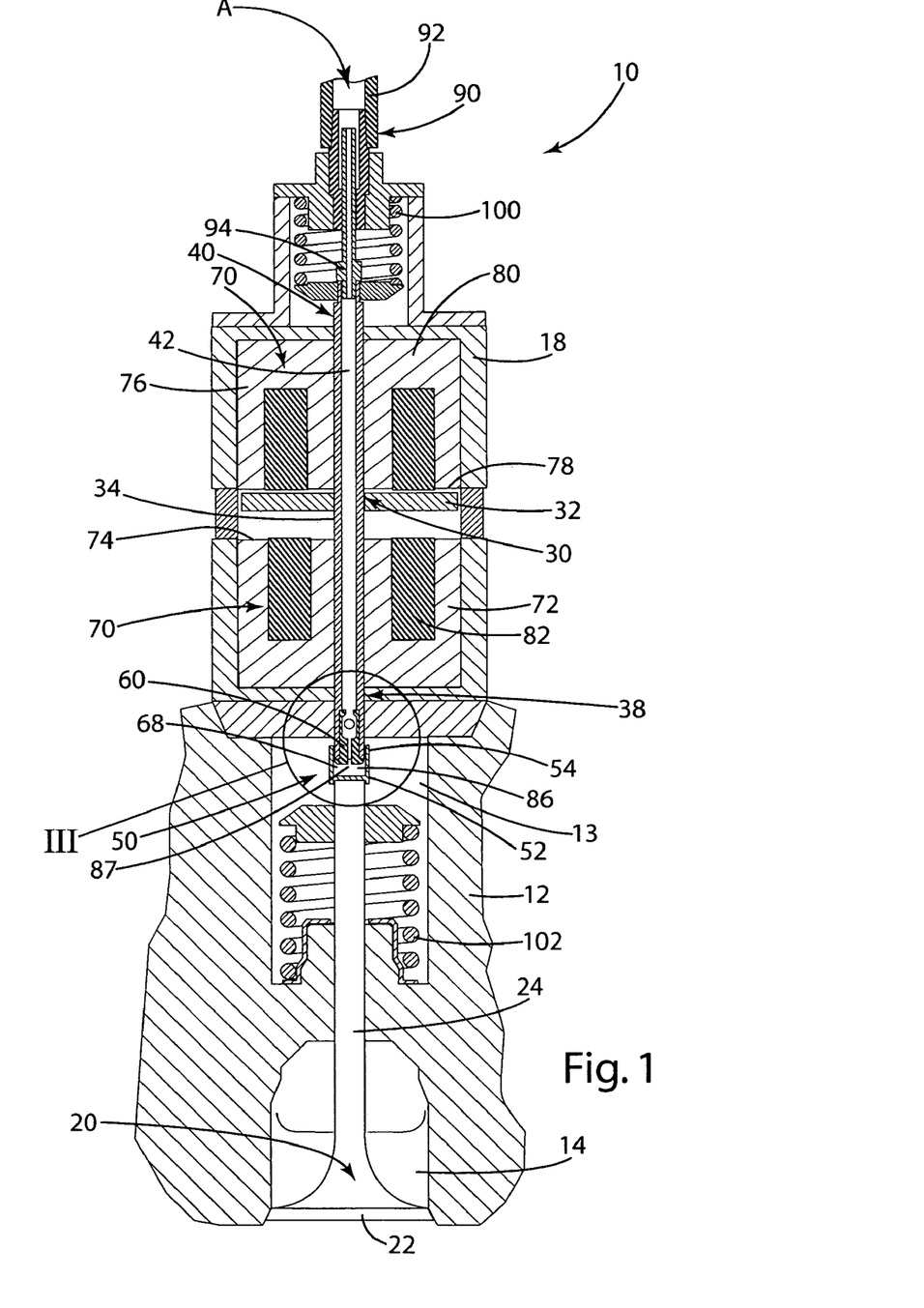
FIG. 1 is a sectional view of a linear electromechanical valve actuator showing the location of the beginning of stroke damper.

A linear electromechanical valve actuator 10 which is typically mounted on an internal combustion engine 12 to open and close a valve 20 such as an intake or exhaust valves is illustrated in FIG. 1. The electromechanical valve actuator 10 includes a beginning of stroke damper 50 to reduce noise, vibration, and harshness concerns associated with the opening of the valve 20. More specifically, the beginning of stroke damper 50 reduces the force of the impact between the armature stem 34 and valve stem 24 as the valve 20 is opened.

The valve 20 generally includes a valve head 22 and the valve stem 24 extending therefrom. The valve 20 has an open position and closed position wherein in the closed position, the valve head 22 seals the valve port 14.

The electromechanical valve actuator 10 also includes an electromagnet assembly 70 and an armature assembly 30 which are similar to those found in traditional electromechanical valve actuators. The electromagnet assembly 70 generally includes a valve electromagnet 72 having a valve pole face 74 and an armature electromagnetic 76 having an armature pole face 78. Each of the electromagnets 72, 76 may be formed from a laminated core 80 to improve magnetic flux and movement of the armature assembly 30. A coil 82 may be situated within the core 80 to provide current for the electromagnet, as is well known in the art. A housing 18 may secure the electromagnets 72 and 76 in position and to the engine 12.

The armature assembly 30 generally includes an armature plate 32 attached to the armature stem 34. The armature stem 34 is hollow and defines a stem passage 42 between an upper end 40 and a lower end 38. During operation the armature plate 32 is attracted alternatively between the valve pole face 74 and the armature pole face 78 in what as generally known as pole-face-to-pole-face operation. An armature spring 100 and a valve spring 102 may be included to facilitate movement of the armature plate 32 from one pole face 74, 78 to the other pole face 74, 78. Therefore, when the valve 20 is closed, the armature plate 32 is held close proximity to or in contact with the armature pole face 78. When it is desirable to open the valve 20, the current to the armature electromagnet 76 is either reduced or eliminated so that the force of the armature spring 100 overcomes the magnetic force from the armature electromagnet 76. With the current supplied to the armature electromagnet 76 being reduced or eliminated, the armature plate 32 is forced toward the valve electromagnet 72 by the armature spring 100. As the armature plate 32 accelerates away from the armature electromagnet 76, the coupled armature stem 34 quickly accelerates toward the valve stem 24, closing the lash gap 86.

The beginning of stroke damper 50 reduces the impact between the armature stem 34 and valve stem 24 as the armature plate 32 moves from the armature electromagnet 76 to the valve electromagnetic 72 thereby reducing noise, vibration, and harshness concerned with the initial opening stroke as the armature stem 34 impacts the valve stem 24. The beginning of stroke damper 50 (FIGS. 2 and 3) generally includes the armature stem 34, valve stem 24, and a lash compensator 52. As described in greater detail below, the beginning of stroke damper 50 forms a cavity 87 between the armature stem 34 and valve stem 24 (FIG. 3). A pocket of fluid is formed within the cavity 87 to reduce the impact between the armature stem 34 and valve stem 24 as the valve 20 is opened. The method of the present invention includes the steps of supplying fluid through the armature stem 34 to the cavity 87 to create the fluid pocket when the valve 20 is closed and reducing the size of the cavity 87 as the valve 20 is opened by displacing fluid from the cavity 87 before the armature stem 34 impacts the valve stem 24.

A fluid feed system 90 is operably connected to the armature stem 34, such as to the upper end 40 of the armature stem 34 (FIG. 1). While the fluid feed system 90 may have a variety of configurations, the fluid feed system 90 generally includes fluid feed lines 92 and connector lines 94 connected to the armature stem 34, in a manner so as not to detrimentally impede the motion of the armature stem. The fluid feed system 90 receives fluid, such as engine oil, from a pressurized source, such as the engine oil pump. The exemplary flow of fluid A into the electromechanical valve actuator is illustrated in FIG. 1. The fluid is then fed through the feed lines 92, through the connector lines 94 and through the stem passage 42 to the cavity 87 which is formed in the lash gap 86 between the valve stem 24 and armature stem 34. The arrows in FIGS. 1-4 show the flow of the oil when the valve 20 is being moved from the open to closed position.

The present invention will be described for use with a linear style electromechanical valve actuator (FIGS. 1 and 7) but may easily be substituted into other valve systems to damp impact, such as the lever based electromechanical valve actuator (FIG. 8) discussed below and with modifications, a traditional valve system. The armature plate 32 in the linear electromechanical valve actuator is generally coupled in a perpendicular relationship with the armature stem 34. The armature stem 34 has an outside diameter 36. The stem passage 42 extends from the lower end 38 to the upper end 40 of the armature stem 34 allowing the passage of the fluid from one end of the electromechanical valve actuator 10 to the other end. The stem passage 42 also reduces the mass of the armature assembly 30, allowing easier transitions between pole faces 74, 78 and greater control during operation.

Figure 2:
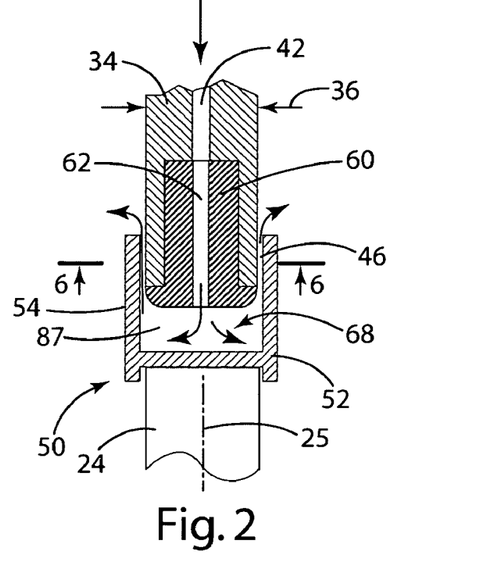
FIG. 2 is an enlarged sectional view of the beginning of stroke damper.
Figure 3:
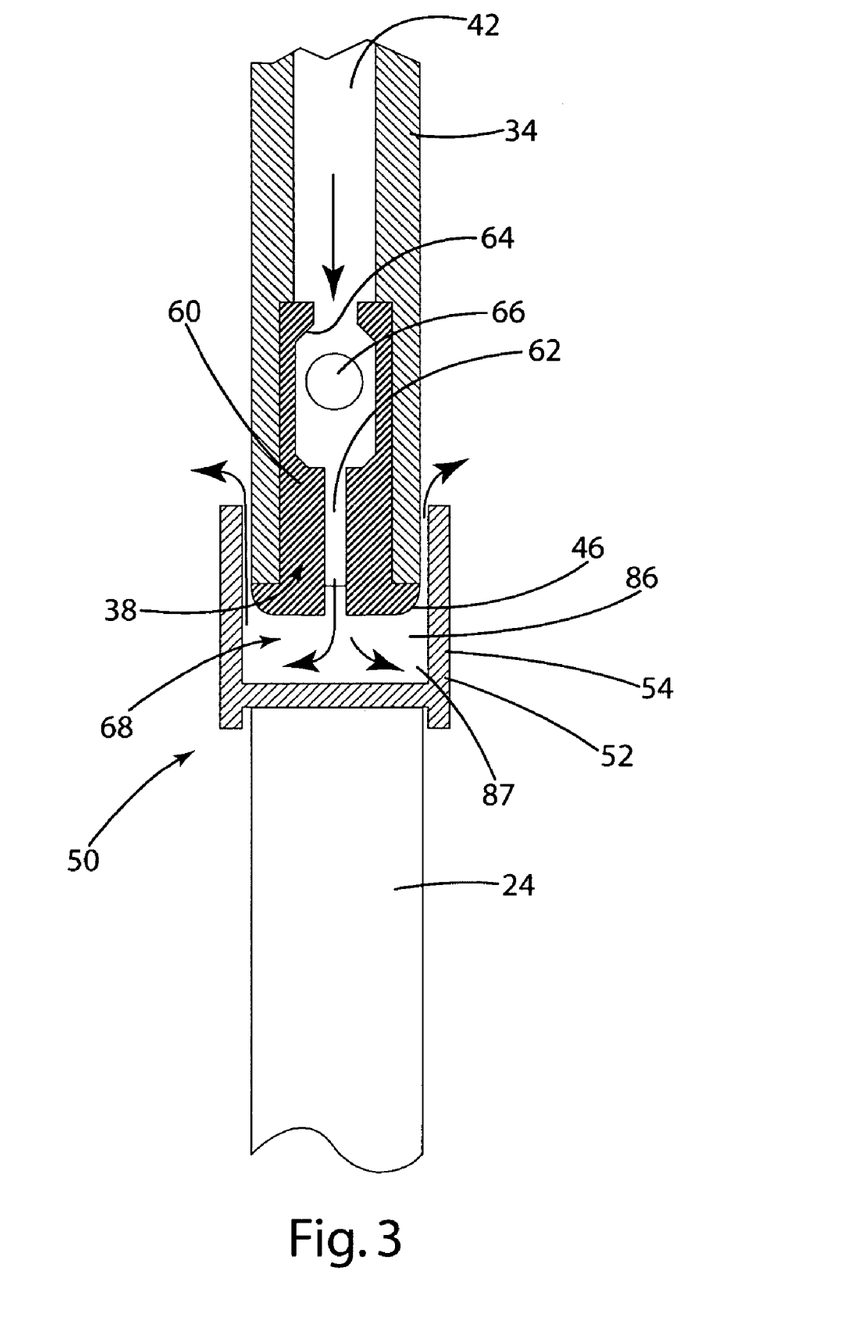
FIG. 3 is an enlarged sectional view of an alternative beginning of stroke damper, including a check ball.
Figure 4:
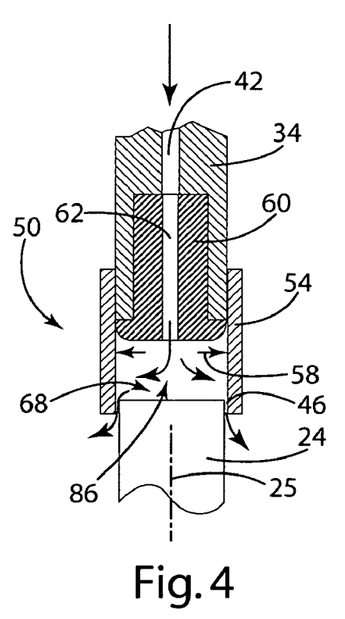
FIG. 4 is an enlarged sectional view of an alternative beginning of stroke damper.
Figure 5:
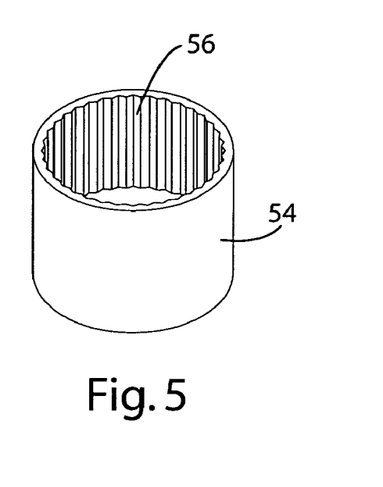
FIG. 5 is a perspective view of an alternative annular sleeve, including grooves to facilitate oil flow.

As illustrated in FIGS. 3 and 4 a stem plug 60 may be inserted into or around the armature stem 34 and includes a fluid passage 62 communicating with the cavity 87. The stem plug 60 may further include a check ball 66 and check ball seat 64 as shown in FIG. 3. Of course, it should be readily recognized by one skilled in the art that the armature stem passage 42 may be configured to supply fluid to the cavity without the stem plug 60 as shown in FIG. 2.

Figure 6:
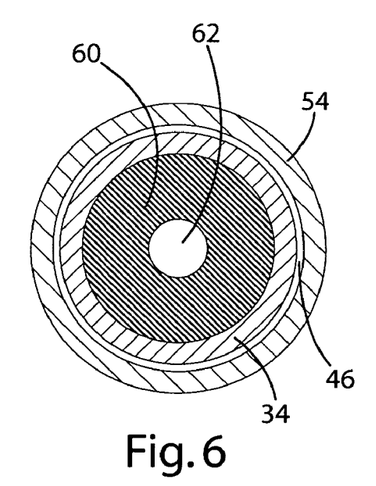
FIG. 6 is a sectional view along line 6-6 in FIG. 2.

In the illustrated embodiment, the lash compensator 52 is coupled to the valve stem 24 and includes an annular sleeve 54, partially defining a cavity 87 (FIGS. 1-3). The annular sleeve 54 extends from the valve stem 24 toward the armature stem 34. The annular sleeve 54 has an inside diameter 58 which is greater than the armature stem 34 outside diameter 36, allowing the armature stem 34 to move along the valve stem axis 25 and within the annular sleeve 54. A pocket of fluid is formed when fluid fills the cavity 87 formed by the lash gap 86 and within the annular sleeve 54. The annular space between the armature stem 34 and annular sleeve 54 is shown in FIG. 6 and referred to as an annular gap 46. The annular gap 46 defines a discharge passage from the cavity 87 and is configured such that, when fluid in the cavity 87 is pressurized above the supply pressure by the motion of the armature stem, the combined discharge flow rate from the cavity 87 through the annular gap 46 and the fluid passage 62 is such that the cavity 87 completely collapses from the discharge of fluid from the cavity 87 until the armature and valve stems contact each other. The collapsing of the cavity 87 is generally accomplished in approximately the time required for the valve 20 to fully open.

During opening of the valve 20, the armature plate 32 moves from the armature electromagnet 76 toward the valve electromagnet 72 and the armature stem 34 is accelerated toward the valve stem 24. The fluid in the cavity 87 limits acceleration of the armature stem 34 relative to the valve stem 24. The armature stem 34, and if attached, the stem plug 60, displace fluid from the cavity 87 through the annular gap 46 as shown by the arrows in FIGS. 2-4, until the armature stem 34 contacts the valve stem 24. In some embodiments, fluid will also be displaced back through the stem passage 42. If the damper 50 does not include a check ball 66, the fluid may also exit the cavity 87 through the fluid passage 62 and/or stem passage 42. As the fluid is displaced from the cavity 87 through the annular gap 46, the cavity 87 is reduced in size and the valve 20 is opened from the closed position. Therefore, during opening of the valve 20, the discharge rate from the cavity 87 is greater than the supply rate to the cavity 87. In the preferred embodiment the armature stem 34, specifically the stem plug 60, contacts the valve stem 24, specifically the lash compensator 52, before or approximately at the same time the valve 20 reaches the open position to facilitate quick transitions between the closed and open positions. If the check ball 66 and check ball seat 64 are included, when the armature stem 34 starts to move away from the armature electromagnet 76, the fluid pressure exerted on the check ball from compression of the cavity 87 and movement of the armature stem 34 moves the check ball 66 toward the check ball seat 64 to seal off the armature stem passage 42 so that the fluid in the cavity 87 is predominantly forced out the annular gap 46. With proper selection of the sizes of the fluid passage 62, stem passage 42, and the annular gap 46, the impact may be absorbed almost as well without use of a one way fluid valve, as shown in FIG. 2.

As the armature stem 34 moves from the open to closed position, fluid is both drawn into and supplied to the cavity 87 through the fluid passage 62 to create the fluid filled cavity 87. Therefore, typically until fluid fills the cavity 87, the discharge rate from the annular gap 46 is less than the fluid supply from the fluid passage 62. Once fluid fills the cavity 87, the rate of supply generally equals the rate of discharge from the cavity. The size of the stem passage 42, fluid passage 62 and annular gap 46 are selected to provide the desired amount of dampening and the desired fluid flow to the cavity 87 to allow the cavity 87 to fill with fluid before the next cycle, and to prevent movement of the valve stem 24 relative to the armature stem 34 while the valve 20 is closed.

The present invention provides a cost efficient low mass beginning of stroke damper 50 that effectively reduces the impact forces, and corresponding noise, vibration, and harshness issues between the armature stem 34 and the valve stem 24 during the initial opening of the valve 20. The method generally includes the steps of providing fluid to the cavity 87 between the armature stem 34 and valve stem 24 and reducing the size of the cavity 87 by displacing fluid from the cavity 87 before impacting the valve stem 24 with the armature stem 34. As discussed above, fluid is supplied through the stem passage 42 defined by the armature stem 34 to the cavity 87. To prevent the valve 20 from opening while the armature plate 32 is held in a close relationship to the armature electromagnet 76, the area to which the fluid pressure is applied, such as the top of the valve stem or the surface area of the lash compensator is limited in size. More specifically, by limiting the size of the area to which fluid pressure is applied, that translates into potential movement of the valve stem, the valve may be prevented from opening when it should be closed. The size of the area is selected so that the pressure of the fluid will not create a hydraulic force that is greater than the preload force that keeps the valve in a closed position. Alternatively or in conjunction with the above, the cavity 87 may have a discharge rate through the annular gap 46 that is equal to or greater than the fluid supply rate through the fluid passage 62 or stem passage 42 to prevent movement of the valve when the armature plate 32 is held in a closed relationship to the armature electromagnet. This selecting of the fluid supply and discharge rates to the cavity 87 prevents a problem commonly associated with hydraulic lifters where, in certain circumstances, the fluid may build up thereby partially opening the valve 20 and reducing engine performance. The adjusting of the discharge rate also ensures that the armature stem 34 may contact the valve stem 24 before or approximately when the valve is in the open position.

It should be readily recognized that the beginning of stroke damper 50 may be used in a variety of other valve actuators such as in lever based electromechanical valve actuator systems. Generally, the damping assembly only needs to be located, as described above in conjunction with the linear based system, between the armature stem 34 and valve stem 24 to provide the desired damping of noise vibration and harshness issues.

Figure 7:
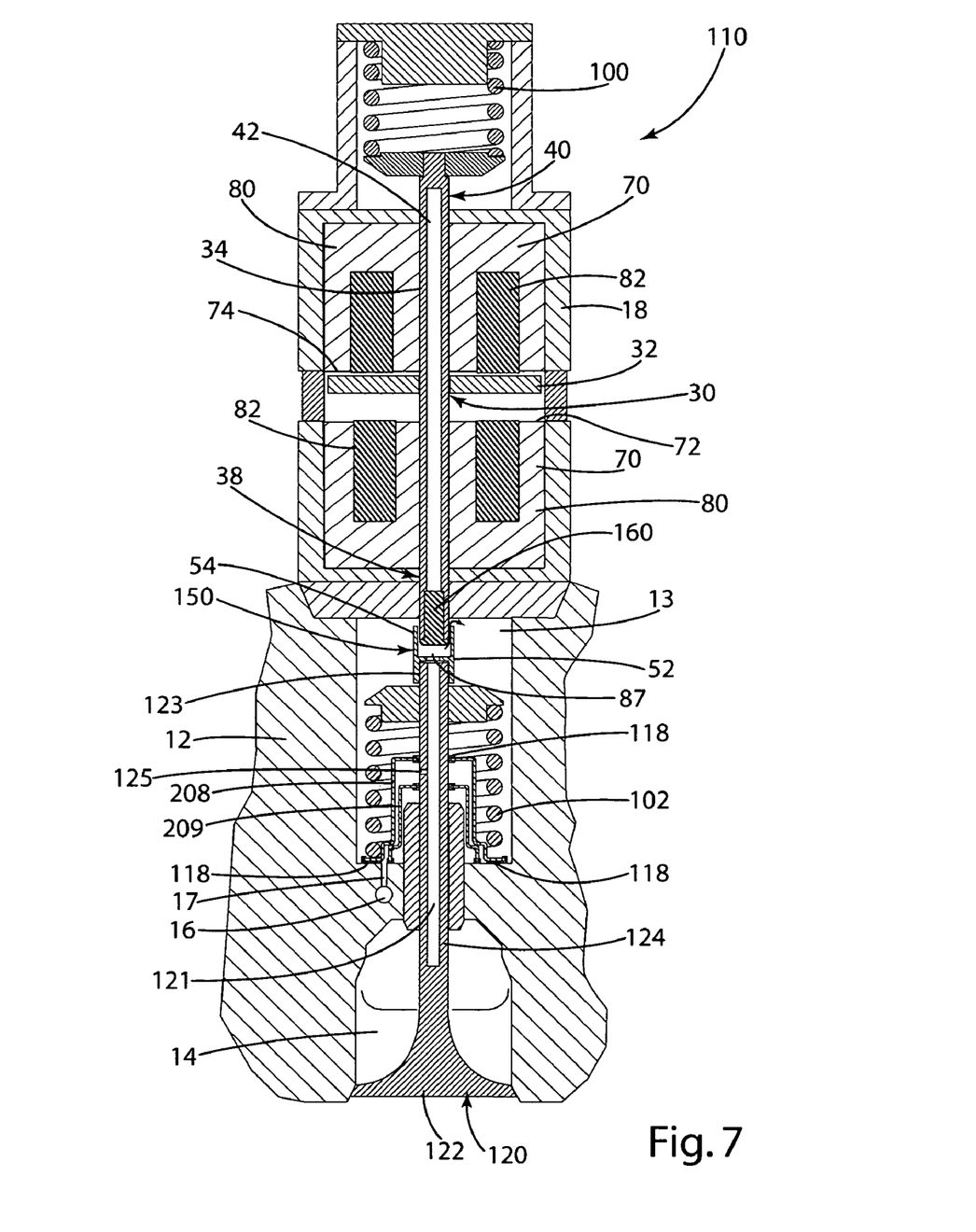
FIG. 7 is a sectional view of an alternative embodiment of a linear electromechanical valve actuator with a beginning of stroke damper.
Figure 8:
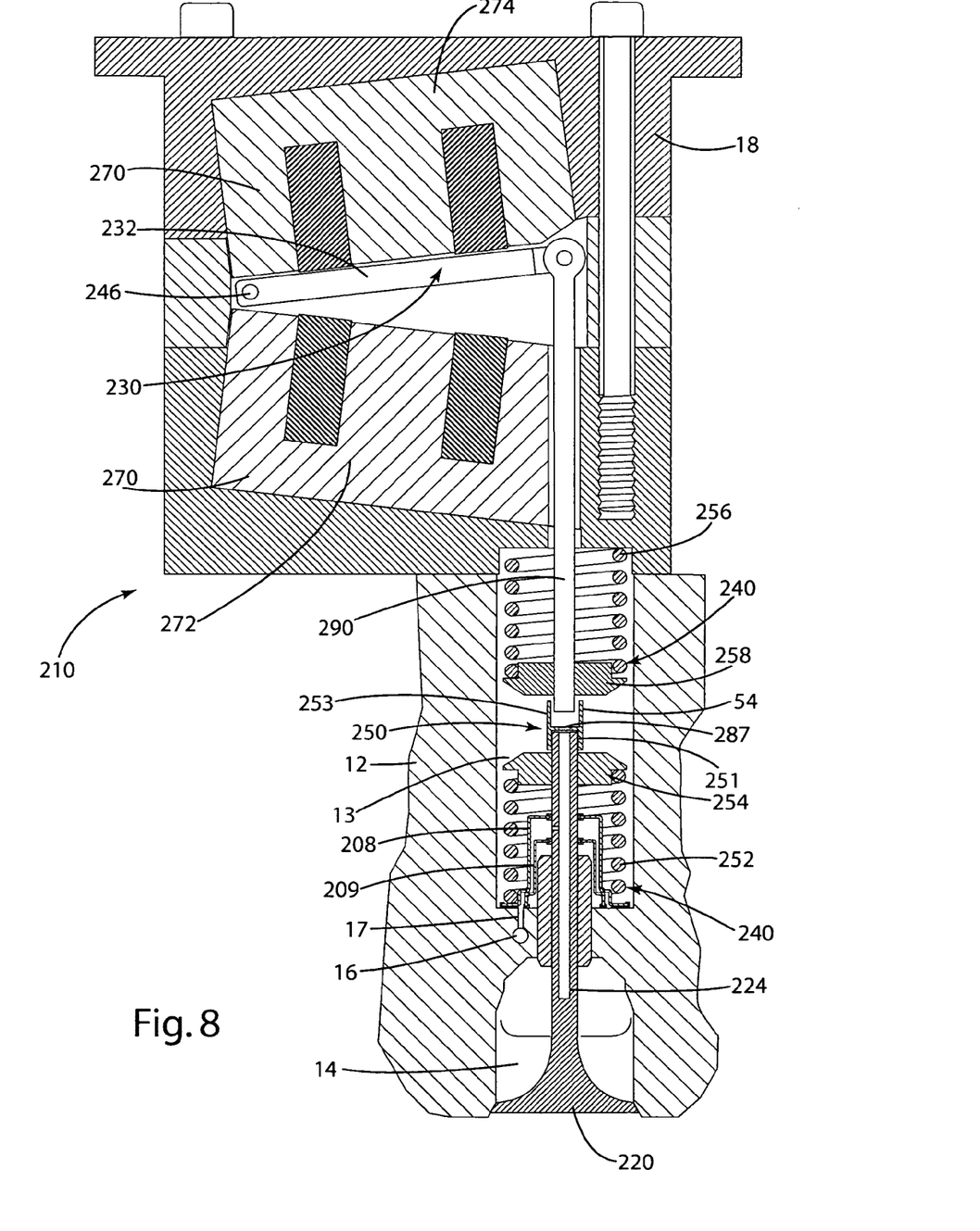
FIG. 8 is a sectional of a lever electromechanical valve actuator having a beginning of stroke damper.

A first alternative embodiment of a linear electromechanical valve actuator 110 is illustrated in FIG. 7. The valve 120 includes a valve stem 124 that has a valve stem passage 121. The valve stem 124 further includes a stem opening 125 between the valve head 122 and the opposing end 123. The valve stem opening 125 allows fluid communication from approximately the middle of the valve stem 124 through the valve stem passage 121 and to the valve stem exit 126 (FIGS. 7 and 8). The engine 12 includes an engine oil gallery 16 having an upward gallery passage 17 extending into the spring cavity 13 defined by the engine 12. A sealed valve spring retainer 108 including a retainer passage 109 allows passage of fluid, such as oil from the oil gallery 16, through the gallery passage 17, through the retainer passage 109 and into the valve stem opening 125. The fluid is then communicated through the valve stem passage 121 to the valve stem exit 126 and into the cavity 87. The sealed valve spring retainer 108 further includes seals 118 that prevent leaking of fluid along the valve stem 124 and into the cylinder as well as preventing a pooling of fluid in the spring cavity 13. The alternative linear electromechanical valve actuator 110 operates as described above in connection with the linear electromechanical valve actuator 10, with the fluid being supplied through the valve stem 124 instead of the armature stem 34 of the linear electromechanical valve actuator 10. The armature stem 34 of alternative linear electromechanical valve actuator 110 may further include a solid stem plug 160 to prevent the flow of oil into the hollow armature stem 34 or may be a solid (not shown).

In a second alternative embodiment, illustrated in FIG. 8, the beginning of stroke damper may also be included on a lever electromechanical valve actuator 210. The lever electromechanical valve actuator 210 includes an armature plate 232, a connecting rod 290 and a spring assembly 240 having an armature spring 256 and a valve spring 252. The armature plate 232 applies a bi-direction force to the spring assembly 240 through the connecting rod 290 to open and close the valve 220. The lever electromechanical valve actuator 210 further includes an electromagnet assembly 270 having a valve electromagnet 272 angled relative to an armature electromagnet 274. The electromagnets 272, 274 are angled to allow armature assembly 230, specifically the armature plate 232 to pivot about an armature pivot axis 246, thereby opening and closing the valve 220.

The spring assembly 240 is retained in place on the valve 220 by a valve spring retainer 254 and the connection rod 290 by an armature spring retainer 258. The beginning of stroke damper 250 is located between the spring retainers 254, 258. The beginning of stroke damper 250 is similar to the beginning of stroke damper 150 of the alternative linear electromechanical valve actuator 110. The spring retainers 254, 258 form the lash compensator 251 with the annular sleeve 253 to define a cavity 287. The spring assembly 250 further includes a lower valve spring retainer 208 that includes the retainer passage 209 to supply fluid to the valve stem 224 from the engine oil gallery 17.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A beginning of stroke damper for an electromechanical valve actuator comprising:
   an armature stem;
   a valve stem;
   a stem passage defined by one of said armature stem and said valve stem;
   a lash compensator defining a cavity, said cavity being in constant fluid communication with said stem passage and wherein said lash compensator is coupled to one of said valve stem and said armature stem, said lash compensator further including an annular sleeve and wherein said annular sleeve and the other of said valve stem and said armature stem define said cavity; and
   a stem plug coupled to said one stem having said stem passage, said stem plug defining a fluid passage communicating with said stem passage.

2. The beginning of stroke damper of claim 1 further including an annular gap, wherein said fluid passage has a maximum fluid passage supply rate and wherein said annular gap has a maximum fluid discharge rate, said maximum fluid discharge rate being approximately equal to or greater than said maximum fluid supply rate.

3. A beginning of stroke damper for an electromechanical valve actuator comprising:
- an armature stem;
- a valve stem;
- a stem passage defined by one of said armature stem and said valve stem;
- a lash compensator defining a cavity, said cavity being in constant fluid communication with said stem passage and wherein said lash compensator is coupled to one of said valve stem and said armature stem, said lash compensator further including an annular sleeve and wherein said annular sleeve and the other of said valve stem and said armature stem define said cavity, and wherein said annular sleeve and said other stem define an annular gap therebetween.

4. The beginning of stroke damper of claim 3 wherein said stem passage has a maximum stem passage supply rate and wherein said annular gap has a maximum fluid discharge rate, said maximum fluid discharge rate being approximately equal to or greater than said maximum stem passage supply rate.

5. A beginning of stroke damper for an electromechanical valve actuator comprising:
- an armature stem;
- a valve stern;
- a stem passage defined by said armature stem, and wherein said armature stem and said stem passage pass through an armature plate; and
- a lash compensator defining a cavity, said cavity being in constant fluid communication with said stem passage.

6. A beginning of stroke damper for an electromechanical valve actuator comprising:
- an armature stem;
- a valve stem;
- a stem passage defined by one of said armature stem and said valve stem;
- a lash compensator defining a cavity, said cavity being in constant fluid communication with said stem passage; and
- an annular gap between said lash compensator and one of said valve stem and said armature stem, said annular gap being in fluid communication with said stem passage and said cavity.

* * * * *

UNITED STATES PATENT AND TRADEMARK OFFICE
CERTIFICATE OF CORRECTION

| | | |
|---|---|---|
| PATENT NO. | : 7,255,073 B2 | Page 1 of 1 |
| APPLICATION NO. | : 10/929969 | |
| DATED | : August 14, 2007 | |
| INVENTOR(S) | : Mark L. Hopper et al. | |

It is certified that error appears in the above-identified patent and that said Letters Patent is hereby corrected as shown below:

Column 10, line 2, Claim 5, "stern" should be --stem--.

Signed and Sealed this

Sixteenth Day of October, 2007

JON W. DUDAS
*Director of the United States Patent and Trademark Office*